J. HOPKINSON.
GRINDER DEVICE FOR MEAT SLICERS.
APPLICATION FILED JUNE 28, 1917.
1,308,786.
Patented July 8, 1919.
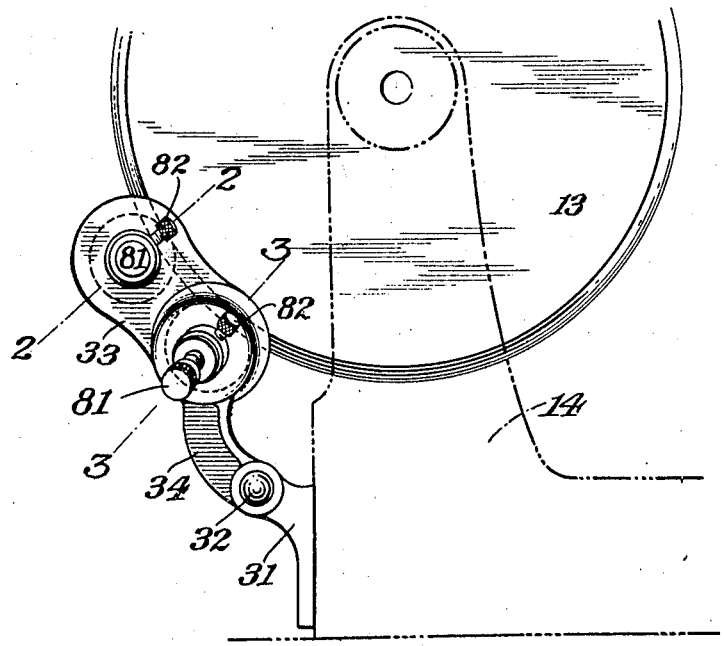
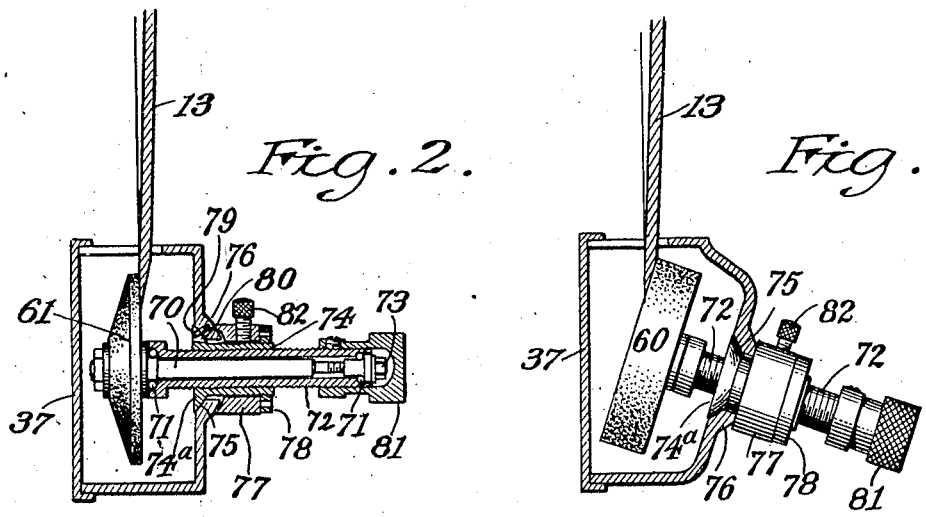
Witness:
Raphaël Netter
Inventor
Joseph Hopkinson,
By his Attorneys

UNITED STATES PATENT OFFICE.

JOSEPH HOPKINSON, OF DAYTON, OHIO, ASSIGNOR TO THE COMPUTING SCALE COMPANY, OF DAYTON, OHIO, A CORPORATION OF OHIO.

GRINDER DEVICE FOR MEAT-SLICERS.

1,308,786.

Specification of Letters Patent.   Patented July 8, 1919.

Application filed June 28, 1917.   Serial No. 177,441.

*To all whom it may concern:*

Be it known that I, JOSEPH HOPKINSON, a citizen of the United States, residing at Dayton, in the county of Montgomery and State of Ohio, have invented certain new and useful Improvements in Grinder Devices for Meat-Slicers, of which the following is a full, clear, and exact description.

This invention relates to improvements in grinder devices for meat slicers.

In the prior copending application of Joseph Hopkinson and Felix Thomas, Ser. No. 106,780, filed June 30th, 1916, there is shown an improved grinder box adapted to contain and support knife grinding devices in position to grind a circular knife on a meat slicer. In the mounting of this box on the slicer base it has been found difficult to properly aline the box so that the grinders are at the exact grinding angle to the knife. The present invention has for its object the improvement of the former device by the provision of a swiveled support for the grinder arbors. These swivels permit the grinder box to be mounted upon the base of the machine without exact setting and provide means for independently setting the grinder arbor to the exact desired angle.

Other objects will be pointed out in detail in the accompanying specification.

In the drawings:

Figure 1 is a side view of a portion of a slicing machine showing the relation of the grinder box to the knife.

Fig. 2 shows a cross section taken on line 2—2 of Fig. 1.

Fig. 3 shows a cross section taken on line 3—3 of Fig. 1.

In more detail 13 is a concavo-convex circular knife journaled upon a pedestal 14. 33 is the grinder box carried by a bracket 34 which is journaled upon a pintle 32 carried by a bracket 31 projecting from the base of the machine. As in the previous construction the box 33 is adapted to be swung about pintle 32 to permit the grinders in the inside of the box to be cleaned. 37 is a removable cover for the box, which cover is removed when cleaning the grinders. Inside the box are two abrasive grinder wheels, grinder 60 is the sharpening grinder and 61 the bur removing grinder. These grinder wheels are fixedly mounted upon arbors 70 one of which is shown in Fig. 2. Arbor 70 is journaled in ball bearings 71 which are carried by an adjustable screwthreaded sleeve 72. A nut 73 is provided on the end of arbor 70 so that the bearings may be adjusted. In order that the grinding wheels 60 and 61 may properly aline with the edges of the circular knife which are to be ground it is necessary that their arbor shafts extend in a particular direction with respect to both the grinder box and the knife. With the former construction I provide means for making these adjustments. These parts will now be described.

Sleeve 72 is exteriorly threaded to receive the inside threads of a supplementary sleeve 74, which sleeve on its inner end is provided with a protuberance 74$^a$ having a portion thereof shaped spherically to take into a spherical concave seat 75 in the inner wall of the grinder box. A complementary spherical convex seat 76 on the outer wall of the box coacts with the concave portion of a locking ring 77, which is of such internal diameter as to pass freely over threads upon the outside of the supplementary sleeve 74. A lock nut 78 coacts with these threads and maintains the locking ring in position. A pin 79 extends from the concave wall of the box into a slot 80 in the protuberance 74$^a$ on the supplementary sleeve 74. This pin fits rather loosely in slot 80 and is adapted to prevent the supplementary sleeve from turning with respect to the grinder box when lock nut 78 is tightened. The parts just described provide a simple means for adjusting the grinders 60 and 61. By loosening nut 78 the grinder and its supporting arbor can be swung freely up and down to the desired position. A somewhat limited degree of movement for adjusting can also be had in a horizontal plane (Fig. 2) on account of the looseness of pin 79 in slot 80. When the grinder wheels are at the correct angle nut 78 is tightened thereby clamping the supplementary outer sleeve 74 tightly in position.

The grinder wheels 60 and 61 may now be advanced or retracted to or away from the knife by turning knurled knob 81 which is rigidly secured on the end of the sleeve member 72. A set screw 82 in the locking ring 72 is adapted to be screwed into contact with the sleeve member 72 and to lock the grinders against axial movement.

The foregoing description has been particularly directed to Fig. 2. It will be understood that the sharpening grinder shown in Fig. 3 is provided with similar adjustments.

It will be understood that my invention may be modified in various ways as will occur to those skilled in the art.

I claim:

1. In a meat slicing machine having a rotary slicing knife, the combination of a grinder box adjacent to the cutting edge of the knife, an inwardly sphero-concave seat carried by a wall of said box and having an aperture, a sleeve extending through the aperture and having a sphero-convex portion fitting said seat to permit angular adjustment of the sleeve in at least two planes, means for securing the sleeve in adjusted position, and a grinder arbor rotatably mounted in said sleeve.

2. A grinder device for a slicing machine, comprising in combination, a grinder box, means associated therewith to adjustably support a grinder arbor therein, said means comprising swivel devices carried by a wall of the box, said swivel devices being provided with means for clamping the same tightly to the wall of the box, after the adjustment has been made.

3. A grinder device for slicing machines, comprising in combination, a grinder box, means associated therewith to adjustably support a grinder arbor therein, said means comprising swivel devices carried by a wall of the box, said swivel devices being interiorly threaded to permit the advancement or retraction of the grinder arbor axially relatively thereto.

4. A grinder device for slicing machines, comprising a grinder box having a wall, one portion of which is spherically curved, swivel devices coöperating with the said spherical portion of the grinder box wall and adapted to be adjusted relatively thereto and to be thereafter clamped in the desired position, and devices carried by the swivel devices for rotatably supporting a grinding wheel.

5. A grinder device for slicing machines, comprising in combination, a grinder box having a spherical concave and convex curvature on the inside and outside wall thereof, a sleeve member projecting through the wall and having a protuberance curved to correspond with the concave inner wall of the grinder box, a locking ring having a portion thereof adapted to coöperate with the convex outer wall of the said box, a lock nut upon the sleeve member adapted to abut against the end of the locking ring and thereby clamp the sleeve member in a fixed position relatively to the walls of the grinder box, and means carried by the sleeve member for rotatably supporting a grinder wheel.

6. A grinder device for slicing machines, comprising in combination, a grinder box having a spherical concave and convex curvature on the inside and outside wall thereof, a sleeve member projecting through the wall and having a protuberance curved to correspond with the concave inner wall of the grinder box, a locking ring having a portion thereof adapted to coöperate with the convex outer wall of the said box, a lock nut upon the sleeve member adapted to abut against the end of the locking ring, and thereby clamp the sleeve member in a fixed position relatively to the walls of the grinder box, and means carried by the sleeve member for supporting a grinder wheel, said means having provisions to permit the grinder wheel to be advanced relatively to the walls of the box whereby the wheel is brought into contact with the knife to be ground.

7. A grinder device for slicing machines, comprising in combination, a grinder box having a spherical concave and convex curvature on the inside and outside wall thereof, a sleeve member projecting through the wall and having a protuberance having a curvature to correspond with the concave inner wall of the grinder box, said protuberance being slotted, a pin projecting from the inner wall of the grinder box into the aforesaid slot, a locking ring loosely mounted upon the sleeve member without the wall of the grinder box, said locking ring having a portion thereof adapted to coöperate with the convex wall of the box, a locking nut threaded upon the sleeve member and adapted to abut against the locking ring and clamp the sleeve member in a fixed position relatively to the walls of the grinder box, and means carried by the sleeve member for rotatably supporting a grinder wheel.

In testimony whereof I affix my signature.

JOSEPH HOPKINSON.